Dec. 22, 1936.     O. KASELITZ     2,064,978
RECOVERING NITROGEN FROM NITROSYL CHLORIDE
Filed July 15, 1933
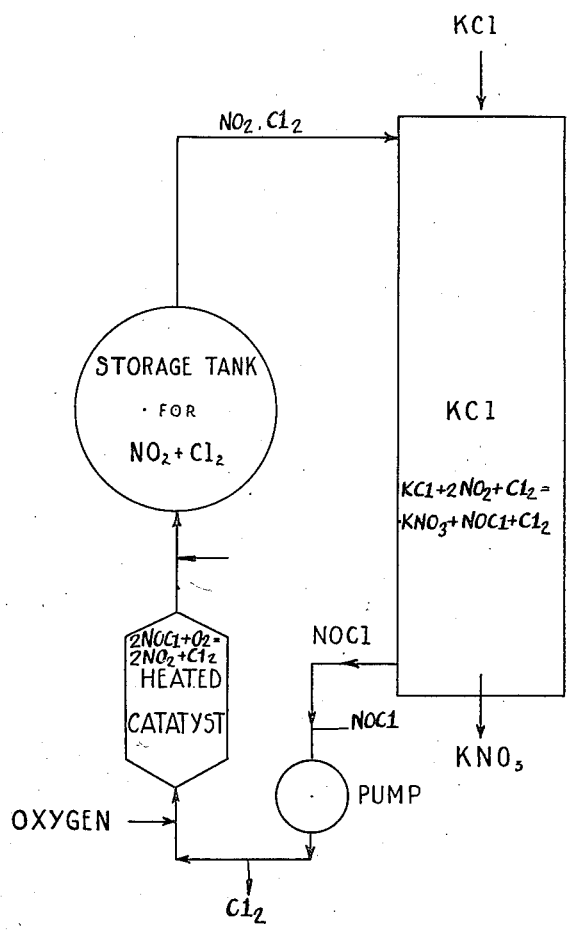

Patented Dec. 22, 1936

2,064,978

UNITED STATES PATENT OFFICE 2,064,978

RECOVERING NITROGEN FROM NITROSYL CHLORIDE

Oskar Kaselitz, Berlin, Germany

Application July 15, 1933, Serial No. 680,662
In Germany November 12, 1932

6 Claims. (Cl. 23—102)

My invention relates to means whereby the combined nitrogen in nitrosyl chloride or mixtures of nitrosyl chloride with other gases can be recovered for further utilization. It is an object of my invention to effect this recovery in a simpler and more efficient manner than has hitherto been possible.

Suggestions to solve the problem of recovery of the combined nitrogen from nitrosyl chloride or mixtures of this gas with other gases, such as are obtained for instance when acting with hydrochloric acid on nitric acid or nitrous gases, have repeatedly been made.

One has for instance suggested to convert NOCl with oxygen or air without or in the presence of a catalyst into a mixture of $NO_2$ and $Cl_2$. This mixture can be separated into its components either by distilling one of the components for instance the $NO_2$, in a suitable solvent, for instance nitric acid, or by freezing the components out, followed by fractional distillation, or also by selective absorption. Obviously the treatment of the waste gases containing the NOCl requires special apparatus.

It is further old to act on alkali chlorides with nitrogen dioxide, with or without oxygen in excess, to form nitrates.

I have found that the nitrosyl chloride after being split up in a well known manner with formation of a mixture of $NO_2$ and $Cl_2$ will react with alkali chlorides or mixtures thereof with the formation of a nitrate and nitrosyl chloride. This nitrosyl chloride, which is mixed with $Cl_2$, can once more be subjected to splitting up with oxygen or air and subsequent reaction with an alkali chloride. The percentage of combined nitrogen in the gas is thus reduced and the combined nitrogen is utilized almost completely under the form of the nitrate, while the chlorine gets more concentrated so that the gas finally obtained consists of chlorine almost free from nitrogen, with which may be mixed inert gases.

The old process mentioned above or recovering the nitrogen dioxide from the mixture of nitrogen dioxide and $Cl_2$ obtained when splitting up nitrosyl chloride with oxygen requires the use of a highly concentrated nitric acid for washing the gas and this acid always contains some chlorine in solution. Moreover a certain quantity of nitric acid is formed in the reaction from the nitrogen of the nitrosyl chloride. As compared with this process the method according to the present invention offers the advantage that no highly corrosive liquids are formed therein.

In order to separate the mixture of nitrogen dioxide and chlorine by freezing and fractional distillation, as hitherto suggested, this mixture must be cooled down to a low temperature which requires very large and expensive cooling surfaces. Besides this operation must be gone through repeatedly in order to effect a thorough purification of the chlorine.

The process of selectively absorbing the chlorine from its mixture with nitrogen dioxide requires large absorption chambers and the subsequent expulsion of the absorbed gases by heating.

In contradistinction thereto the new process results directly in two final products, i. e. alkali nitrate and chlorine.

I have found it particularly advantageous to apply the new method to the nitrosyl chloride obtained when producing alkali nitrate from alkali chloride by means of nitric acid in the vapor phase or nitrous gases. When repeating the splitting up of the nitrosyl chloride and the reaction of the nitrogen dioxide with alkali chloride, the operation being carried out in countercurent similarly to the Hargreaves process, a technically pure alkali nitrate is obtained. When thus combining the two processes the alkali chloride is completely converted into nitrate without any substantial quantities of nitrogen being lost.

In practising my invention I may for instance proceed as follows:

*Example 1*

In an apparatus allowing circulation of the gases treated and measuring about 2000 ccm. a mixture of one part by volume NOCl and two parts O is caused to alternately act on a $SiO_2$ catalyst heated to about 250° C. in order to split up the NOCl with the formation of $NO_2$ and Cl and to thereafter pass, after cooling to room temperature, over solid grained KCl. After the lapse of about half an hour, i. e. after the gases have been circulated about 8 to 10 times, 98.8% of the $NO_2$ contained in the original gas mixture is recovered under the form of potassium nitrate, the balance of 1.2% escaping together with the chlorine.

*Example 2*

Into an apparatus consisting of a reaction vessel filled with silica gel heated to about 250° C., a tower of about 500 ccms filled with agglomerated KCl globules, a reservoir of about 4 litres and a small circulating pump is introduced a gas mixture composed of 750 ccm. nitrosyl chloride and about 4000 ccm. air. This mixture is circulated in the apparatus and after the lapse of about one hour about 97% of the nitrogen present in the gas under the form of nitrosyl chloride is converted into solid potassium nitrate.

The process is illustrated by the accompanying flow sheet.

*Example 3*

In an apparatus measuring about 2000 ccm. a gas mixture containing equal parts by volume nitrosyl chloride and chlorine (corresponding to the gas composition above aqua regia) and about two parts oxygen is alternately circulated by means of a small pump in contact with a silica gel catalyst heated to about 200 to 250° C. but not beyond 300° C. and, after the gases have cooled down to room temperature, in contact with agglomerated KCl. After the mixture has circulated in this manner about 10 to 12 times, substantially all the nitrogen in the nitrosyl chloride has been converted into solid potassium nitrate.

Various changes may be made in the details disclosed in the foregoing specification without departing from the invention or sacrificing the advantages thereof.

I claim:

1. The method of recovering the combined nitrogen from nitrosyl chloride comprising acting on the nitrosyl chloride with oxygen to convert it into $NO_2$ and $Cl_2$ reacting the mixture of $NO_2$ and Cl with a solid alkali metal chloride and drawing off the $Cl_2$ formed from the nitrate formed.

2. The method of recovering the combined nitrogen from nitrosyl chloride comprising acting on the nitrosyl chloride with oxygen to convert it into $NO_2$ and Cl, reacting the mixture of $NO_2$ and Cl with solid KCl and drawing off the $Cl_2$ formed from the nitrate formed.

3. The method of recovering the combined nitrogen from nitrosyl chloride comprising causing a mixture of NOCl and $O_2$ to alternately pass in contact with a $SiO_2$ catalyst heated between 200 and 300° C. and with solid KCl and drawing off the $Cl_2$ formed from the nitrate formed.

4. The method of recovering the combined nitrogen from nitrosyl chloride comprising causing a mixture of NOCl and $O_2$ to alternately pass in contact with an $SiO_2$ catalyst heated between 200 and 300° C. and, after having cooled down, with solid KCl and drawing off the $Cl_2$ formed from the nitrate formed.

5. The method of recovering the combined nitrogen from nitrosyl chloride comprising acting on the nitrosyl chloride with oxygen to convert it into $NO_2$ and $Cl_2$, reacting the mixture of $NO_2$ and $Cl_2$ with a solid alkali metal chloride to form alkali metal nitrate and nitrosyl chloride, repeating both these steps, using therein this nitrosyl chloride, containing this treatment until substantially the whole of the nitrogen introduced as nitrosyl chloride is combined in nitrate form, and drawing off for further use the gas substantially free from nitrogen oxides.

6. The method of claim 5, in which the nitrosyl chloride is fed to a series of receptacles filled with solid KCl, oxygen being admixed to the NOCl and to the mixture of gases formed therefrom in contact with the KCl, before the NOCl and this mixture of gases enter a receptacle.

OSKAR KASELITZ.